United States Patent [19]

Woods et al.

[11] 3,935,954

[45] Feb. 3, 1976

[54] COMPACTED HAY TRANSPORT

[76] Inventors: Donald L. Woods; Kenneth G. Woods; Ray A. Woods, all of 202 N. Main, Fairview, Okla. 73737

[22] Filed: July 8, 1974

[21] Appl. No.: 486,733

[52] U.S. Cl. ............ 214/352; 214/506; 214/DIG. 4
[51] Int. Cl.² .......................................... B60P 1/04
[58] Field of Search ............ 214/506, 130 R, 130 C, 214/768, 778, 144, 352, DIG. 3, DIG. 4

[56] References Cited
UNITED STATES PATENTS
2,468,297  4/1949  Jones .................................. 214/352
3,700,132  10/1972  Waters ........................... 214/778 X

*Primary Examiner*—Albert J. Makay
*Attorney, Agent, or Firm*—Robert K. Rhea

[57] ABSTRACT

A two-wheel type trailer having a forklift frame, pivotal about the axis of the trailer wheels, and a telescoping tongue means adapted to be connected with a prime mover. A hay bale is loaded on and unloaded from the forklift frame by pulling and pushing on the telescoping tongue by a prime mover. Remotely operated hydraulic control means "sets" the wheel brakes and unlocks latching means to permit the loading and unloading operation.

7 Claims, 12 Drawing Figures

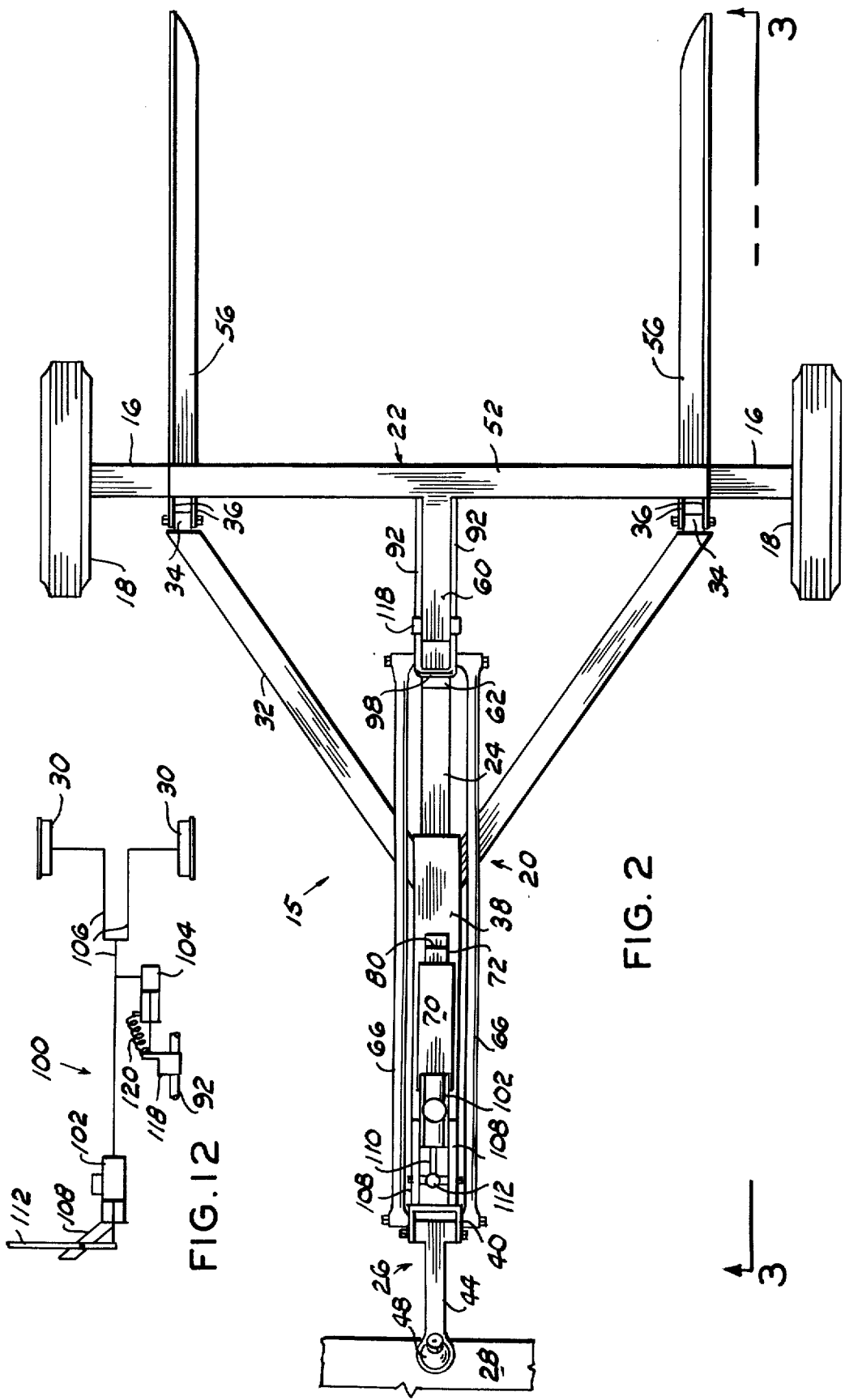

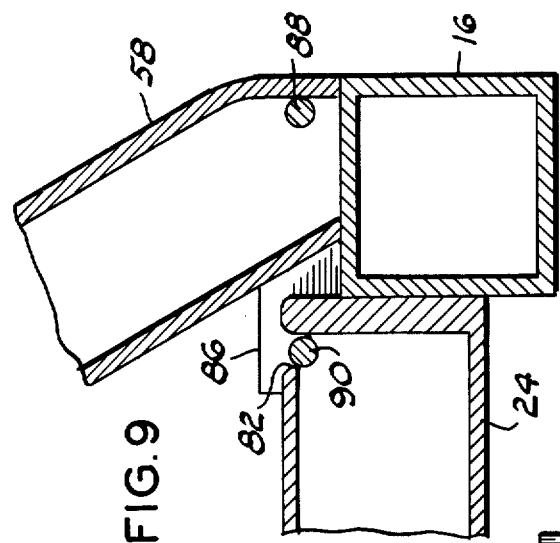
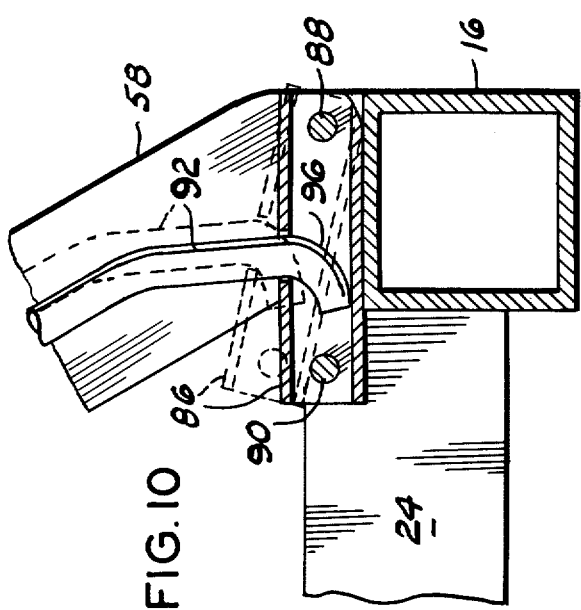
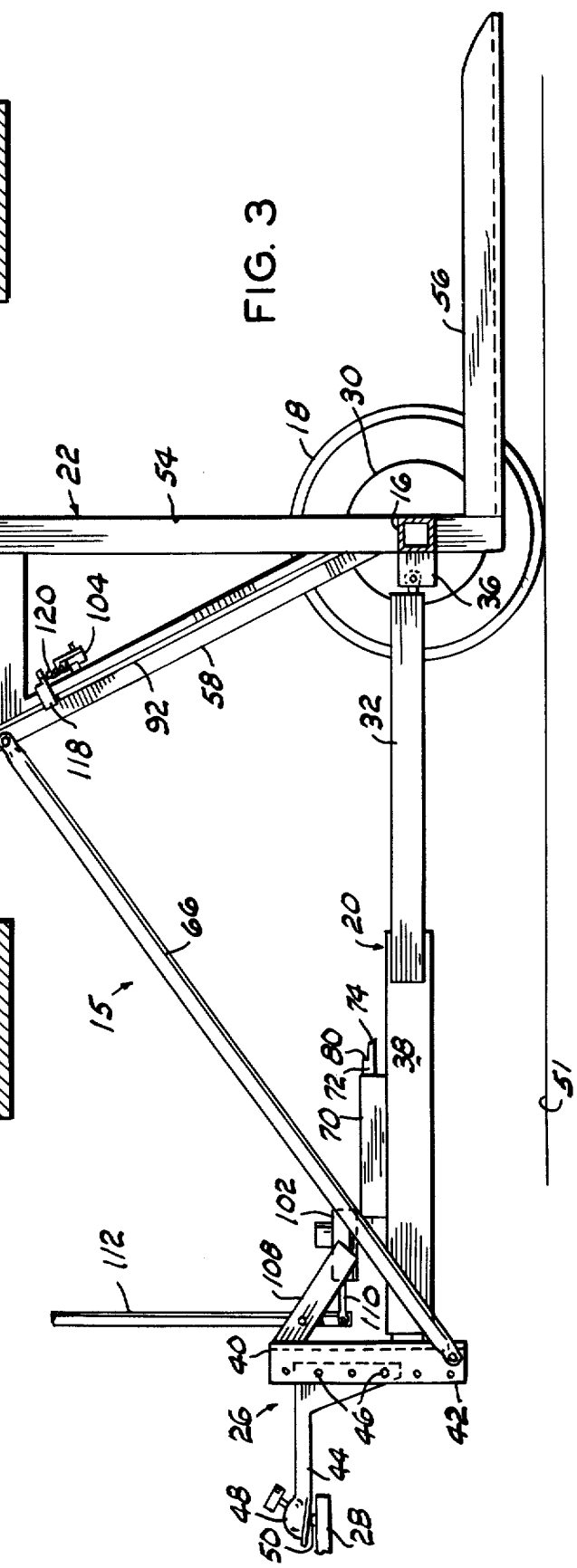

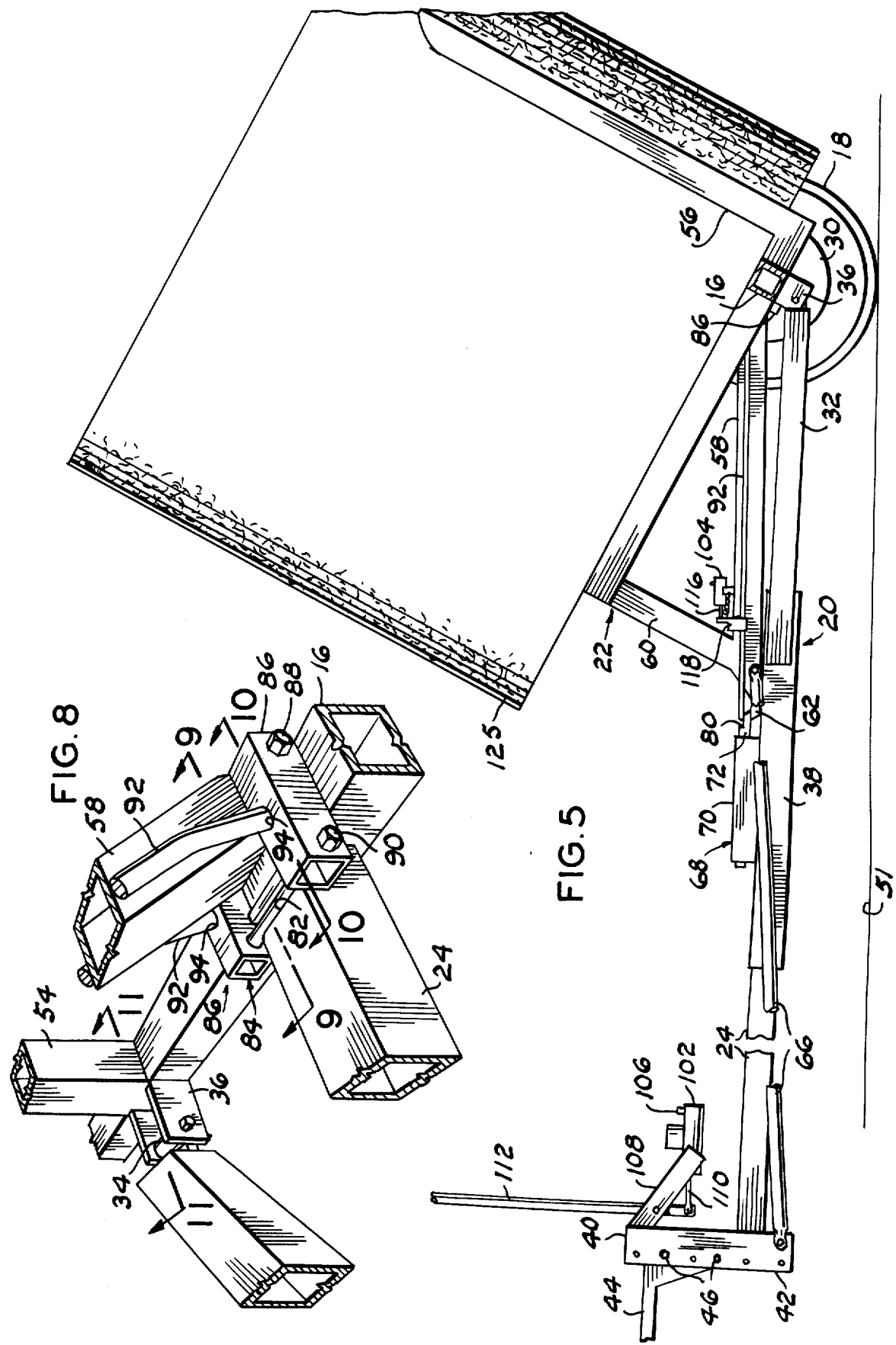

COMPACTED HAY TRANSPORT

BACKGROUND OF THE INVENTION

1. Field of the Invention

The present invention relates to farm implements and more particularly to a self-loading and transporting trailer-like device for jumbo size hay bales or the like.

Hay balers presently in use form relatively large compacted bales of hay which are generally cylindrical. These jumbo size hay bales are on the order of 6 or more feet in diameter and 5 or more feet long having a mass approximating one-half ton and are, therefore, difficult to move from the field to a place of storage or for feeding.

2. Description of the Prior Art

Prior patents disclosing hay pick up and transporting devices generally relate to a sweep rake and feature a windlass means for lifting hay supporting tangs, such as is disclosed by U.S. Pat. Nos. 2,271,591 and 2,462,152. A skid-type elongated log loader, similarly using pulley means, is disclosed by U.S. Pat. No. 2,491,030. A conventional size rectangular hay bale pickup and transporting wagon is disclosed by U.S. Pat. No. 2,848,127.

This invention is distinctive over these patents by the elimination of the windlass or pulley means or conveyors, as in U.S. Pat. No. 2,848,127, wherein the loading operation is accomplished by forward and rearward movement of a prime mover acting on a telescoping tongue member.

SUMMARY OF THE INVENTION

A two-wheel type trailer, having an axle portion journalling a pair of hydraulic brake equipped wheels at its respective ends, includes tongue guide means pivotally connected to the axle portion. A forklift frame is integrally mounted on the axle portion and includes a normally upright portion and a pair of normally horizontal tangs extending rearwardly in parallel spaced relation for vertical pivoting movement of the frame and axle portion about the axis of the wheels toward and away from the surface of the earth. An elongated tongue is provided with hitch means at its forward end for connection with a prime mover and is slidably supported, intermediate its ends, by the tongue guide means. A pair of links extend between and are connected, respectively, with the forward end portion of the tongue and upper limit of the frame for pivoting the frame about the axis of the wheels. Latch means connects the upper portion of the frame to the tongue guide means when the forklift is in loaded position and connects the rearward end portion of the tongue to the forklift frame when the latter is in travel or bale loading position. Remotely operated hydraulic means, including a lever actuated master cylinder is connected with the wheel brakes and latch means so that when the forklift tangs are disposed under a hay bale to be loaded the trailer brakes are then "set" by pulling on a flexible strand connected with the lever. The trailer tongue is then pulled forwardly by the prime mover wherein the pair of links pivot the forklift frame forwardly about the axis of the wheels to lift the tangs and the hay bale. The latching means maintains the forklift frame in bale loaded position.

The principal object of this invention is to provide a self-loading bale transport adapted to be connected with and operated by a prime mover acting on a telescoping tongue for pivoting a bale loading frame about the axis of the trailer wheels.

BRIEF DESCRIPTION OF THE DRAWINGS

FIG. 2 is a top plan view;

FIG. 3 is a side elevational view, partially in section, taken along the line 3—3 of FIG. 2;

FIG. 5 is a fragmentary side elevational view illustrating the device in bale loaded position;

FIG. 8 is a fragmentary perspective view illustrating the tongue latch means connecting the tongue to the forklift frame;

FIGS. 9 and 10 are fragmentary vertical cross sectional views, to a larger scale, taken substantially along the lines 9—9 and 10—10 of FIG. 8, respectively;

DESCRIPTION OF THE PREFERRED EMBODIMENT

Figure 1:
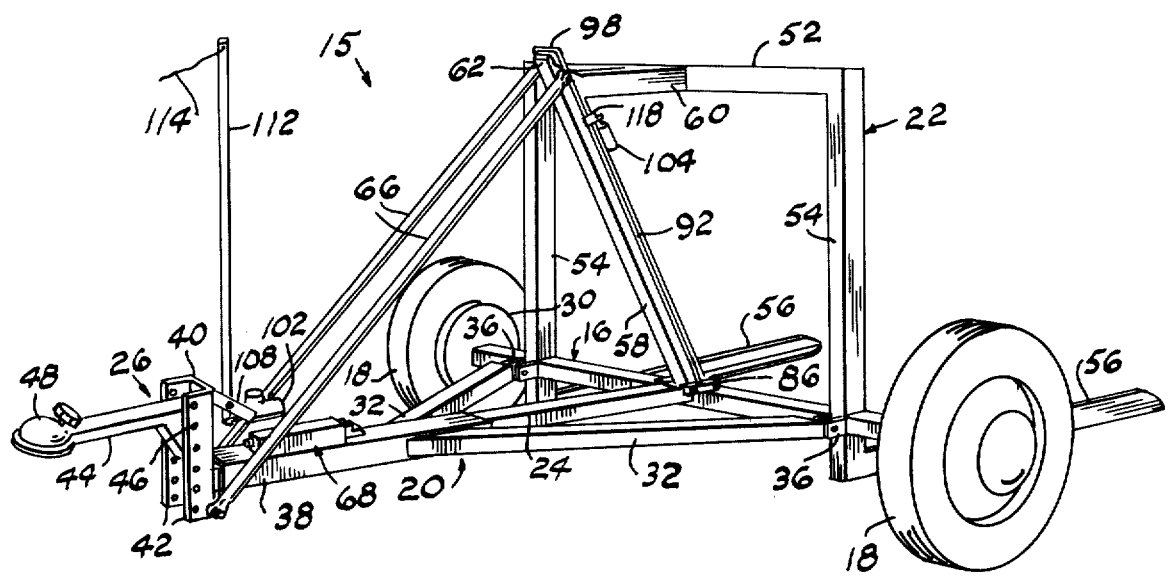
FIG. 1 is a perspective view of the device.

Like characters of reference designate like parts in those figures of the drawings in which they occur.

In the drawings:

Referring more particularly to FIG. 1, the reference numeral 15 indicates the device, as a whole, which is two-wheel trailer-like in general configuration comprising an axle portion 16 journalling a pair of wheels 18 at its respective end portions and a forward tongue guide means 20 pivotally connected with the axle portion 16 in the manner presently explained. A forklift frame 22, dimensioned to accommodate a bale to be supported, is integrally secured to the axle portion 16 and a tongue member 24 is slidably supported by the tongue guide means 20 with the forward end portion of the tongue 24 being provided with a hitch means 26 for connecting the device 15 to a prime mover, such as a pickup truck, or the like, indicated at 28 (FIGS. 2 and 3).

Figure 11:
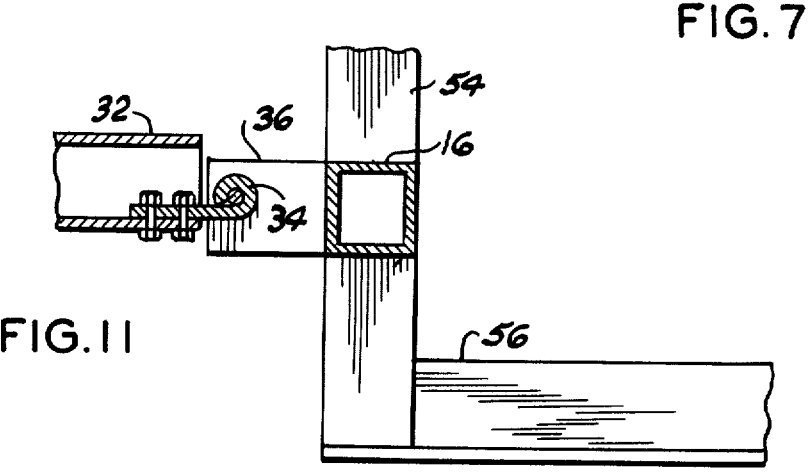
FIG. 11 is a fragmentary vertical cross sectional view, to a different scale, taken substantially along the line 11—11 of FIG. 8; and, FIG. 12 is a schematic.

The wheels 18 are provided with hydraulic cylinder operated brakes, not shown, contained by brake drums 30. The tongue guide means 20 comprises a pair of elongated braces 32 pivotally connected, at their respective rearward ends, by a shackle link 34 interposed between a pair of ear plates 36 (FIGS. 8 and 11) secured to respective end portions of the axle portion 16. The braces 32 project forwardly in converging relation and are connected to opposing sides of the rearward end portion of an elongated tubular housing 38 having its axis normal to the axis of the axle portion 16. The tongue 24 is slidably received, intermediate its ends, by the housing 38 and extends rearwardly from the forward end thereof to the forward surface of the axle portion 16.

The hitch means 26 comprises an upright channel member 40 rigidly secured intermediate its ends to the forward end of the tongue 24 with the legs 42 of the channel shape projecting forwardly. A hitch arm 44 is vertically adjustably secured by bolts 46 between the channel legs 42 and is provided at its forward end with a conventional trailer hitch socket 48 for receiving a trailer hitch ball 50 secured to the rearward end of the pickup truck 28. The vertically adjustable feature of the hitch arm 44 is for the purposes of compensating for the position of the trailer hitch ball 50 with respect to the surface of the earth 51 and dispose the tongue 24 substantially horizontal.

The forklift frame 22 comprises a normally upright portion of generally inverted U-shape having its bight portion 52 horizontally disposed and its respective legs 54 rigidly secured, as by welding, to the axle portion 16 at the position of the ear plates 36. A pair of normally horizontally disposed tangs 56 are respectively secured in rearwardly projecting parallel relation to the axle portion 16 below the frame legs 54. The frame 22 further includes an arm 58 secured at one end to the axle portion 16 medially its ends in forwardly and upwardly inclined relation and is connected at its upper end portion by a normally horizontal arm brace 60 extending between the arm 58 and the frame bight portion 52 medially the ends of the latter. The end of the arm 58, opposite the axle portion 16, is provided with a latch plate 62 having an inclined striker surface 64 (FIG. 7) for the purposes presently explained.

A pair of elongated push-pull rods or links 66 extend between and are pivotally connected respectively to opposing sides of the depending end portion of the hitch channel 40 and end portion of the arm 58 adjacent the latch plate 62. The purpose of the links 66 is to pivot the frame 22 and axle portion 16 about the horizontal axis of the wheels 18 when the tongue 24 is slidably moved forwardly with respect to the tongue guide means 20 from the position shown in FIG. 1 to the position shown by FIG. 5 in the manner more fully explained hereinbelow.

Frame latch means 68 (FIGS. 6 and 7) is mounted on the upper surface of the tongue housing 38 and comprises a tube 70 longitudinally aligned with the axis of the housing and slidably receiving a latch 72 projecting rearwardly toward the axle portion 16. The latch 72 is provided with an upwardly and forwardly inclined striker surface 74 facing rearwardly for cooperative contact with the arm striker surface 64.

A spring 76, contained by the tube 70, normally biases the latch 72 rearwardly into locking engagement with respect to the latch plate 62. A threaded screw 78, contained by the forward end portion of the tube 70, permits adjusting the distance of the latch 72 protruding rearwardly of the tube. The upwardly disposed surface of the latch 72 is provided with a rearwardly facing transverse shoulder 80 for the purposes presently explained.

The rearward end portion of the tongue 24 is provided with a transverse upwardly open recess 82 (FIGS. 8 and 9) for engagement with tongue latch means 84. The latch means 84 comprises a pair of elongated box members 86 pivotally secured respectively, at one end portion, to opposing sides of the depending end portion of the arm 58 adjacent the axle portion 16 by a bolt 88. A latch pin 90 extends transversely between the other end portion of the box members 86, projecting forwardly of the axle portion 16, for entering the tongue recess 82. A pair of latch rods 92 have one of their respective end portions inserted through an aperture 94 formed in the upper surface of the respective box member 86 with the inserted end portion of each rod 92 arcuately curved, as at 96 (FIG. 10), for raising and lowering the box members 86 by axial movement of the rods 92. The rods 92 extend longitudinally along opposing sides of the arm 58 beyond the latch plate 62 and are joined at their forward ends by a bight portion 98 overlying the latch 72 when the arm 58 is disposed in the position shown by FIGS. 5, 6 and 7. When the latch 72 is engaged with the arm latch plate 62, the rod bight portion 98 is normally disposed against the latch shoulder 80 for releasing the latch 72 as presently explained.

Referring also to FIG. 12, hydraulic control means 100 comprising a master cylinder 102, a slave cylinder 104 and hydraulic lines 106 is utilized to operate the device 15. The master cylinder 102 is substantially conventional and is mounted in horizontal vertical spaced relation above the forward end portion of the tongue 24 by a pair of arms 108 extending angularly downward and rearwardly from the upper end portion of the hitch channel 40. The piston rod 110 of the master cylinder is pivotally connected to the depending end portion of an elongated upright lever 112 pivotally supported for vertical pivoting movement between the support arms 108. An elongated flexible strand, such as a rope 114, is connected with the upper limit of the lever 112 and extends forwardly to the position of the operator in the pickup truck 28. The slave cylinder 104 is mounted on the frame arm 58 near the arm brace 60 (FIGS. 3, 5 and 6) with the slave cylinder piston rod 116 projecting toward the arm brace 60 and bearing against an inverted U-shaped plate 118 extending transversely across the arm 58 and connected at its respective ends with the rods 92 for the purpose of axially moving the rods 92 and moving the rod bight portion 98 in a direction away from the axle portion 16 and releasing the latch 72 and tongue 24, as explained in more detail hereinbelow.

Springs 120, extending between and connected with the plate 118 and slave cylinder 104, normally biases the rods 92 toward the axle portion 16 and retracts the slave cylinder piston rod 116.

OPERATION

Figure 4:
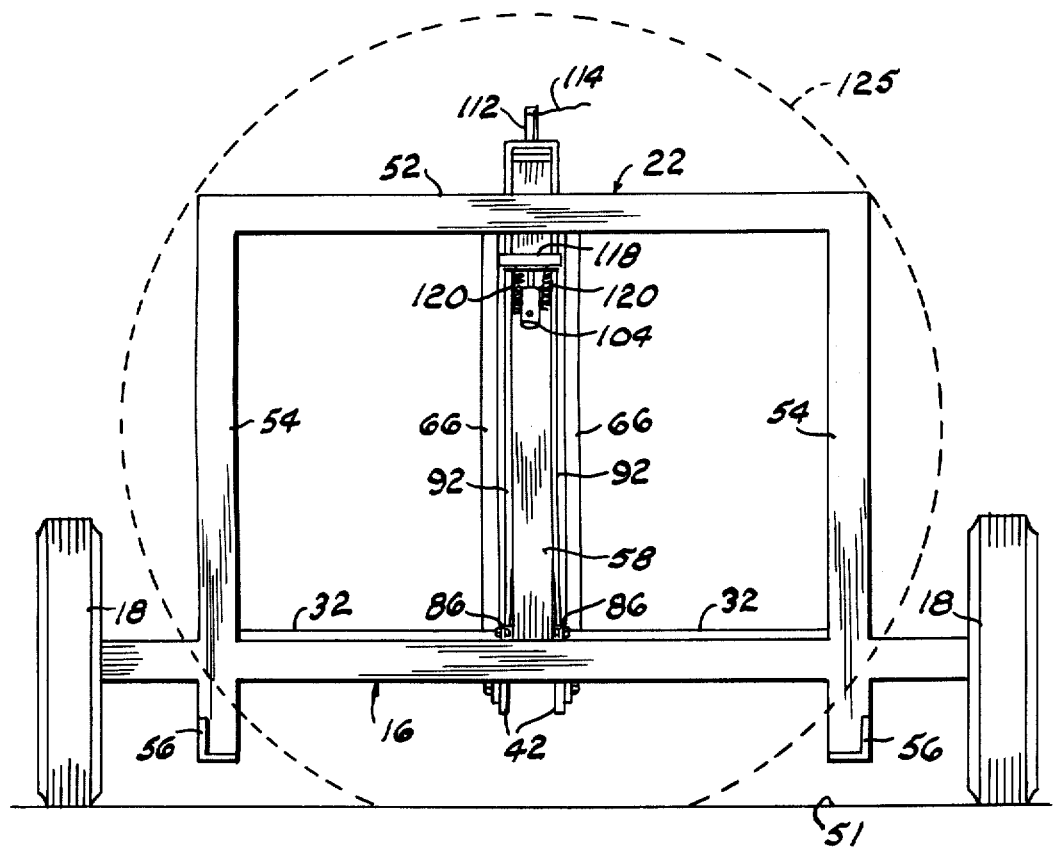
FIG. 4 is a rear end elevational view illustrating, by dotted lines, the relative position of a hay bale to be loaded.
Figure 6:
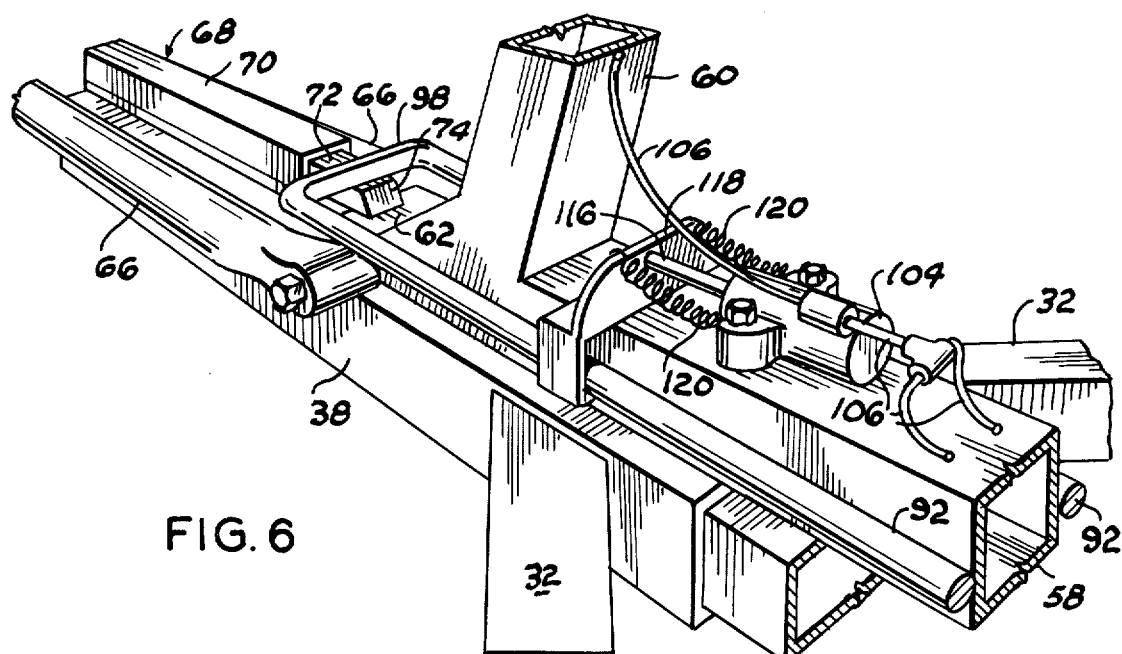
FIG. 6 is a fragmentary perspective view, to a larger scale, illustrating the frame latch and release means.
Figure 7:
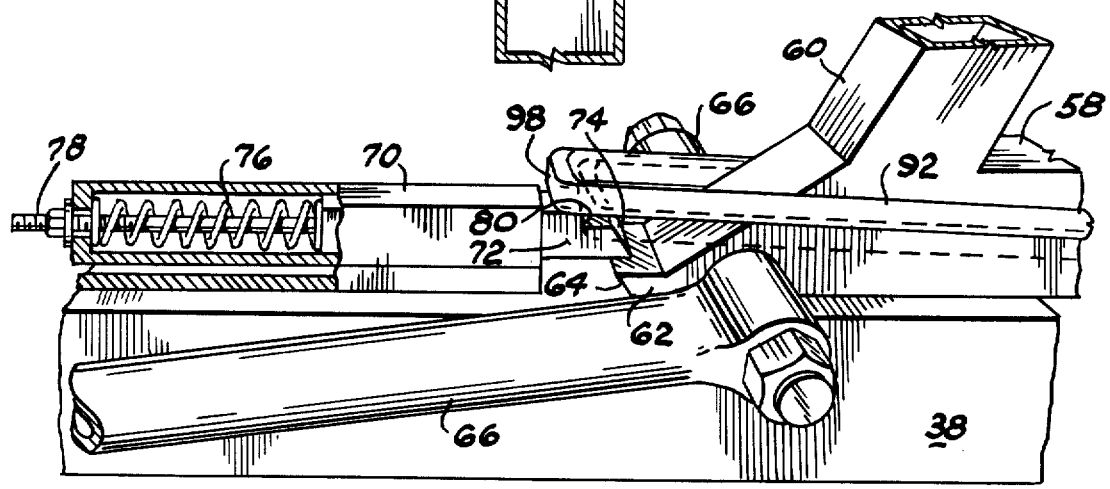
FIG. 7 is a fragmentary perspective view, partially in section, illustrating additional details of the frame latch means.

A hay bale 125, to be transported, is normally disposed on the surface of the earth 51 with the axis of the bale parallel therewith. In travel and bale loading position the device 15, when connected with the pickup 28, is normally in the position shown by FIGS. 1 and 3 wherein the forklift tangs 56 are horizontally disposed. The device 15 is backed toward one end of the hay bale 125 with the axis of the tongue 24 in substantial alginment with the axis of the hay bale wherein the tangs 56 each extend longitudinally adjacent an arc of the periphery of the bale near the earth's surface (FIG. 4) until the frame legs 54 and its bight portion 52 contact the adjacent end surface of the hay bale. The operator then pivots the upper end portion of the lever 112 forwardly by the rope 114 to operate the master cylinder 102 and apply hydraulic fluid pressure to the wheel brakes via the lines 106 (FIG. 12) to set the brakes. Simultaneously the slave cylinder 104 moves the rods 92 in an axial direction to pivot the box members 86 to their dotted line tongue release position of FIG. 10 while the pickup truck then moves forwardly to slidably extend the tongue forwardly with respect to the frame 22 and simultaneously the pair of links 66, pulling on the arm 58, pivots the frame 22 about the horizontal axis of the wheels 18 thus tilting the tangs 56 into engagement with and lifting the bale 125. Forward movement of the pickup and tongue 24 continues until the arm latch plate striker surface 64 slidably contacts the latch striker surface 74 which locks the arm 58 adjacent the upper surface of the tongue housing 38 (FIGS. 5, 6 and 7). The rod bight portion 98 then overlies the upper surface of the latch 72 forwardly of the latch shoulder 80, as shown by solid lines (FIG. 7). When the lever 112 is released the springs 120 biases the rods 92 toward the axle portion 16 so that the rod bight portion 98 abuts the latch shoulder 80. In this position the bale transporting position the center of gravity of the bale 125 is disposed forwardly of the axis of the wheels 18, as shown in FIG. 5. The bale 125 may then be moved by the pickup truck to a desired location in a trailer-like fashion.

The bale is unloaded by again pulling forwardly on the lever 112 which again sets the brakes and simultaneously the slave cylinder 104 forces the rod bight portion 98 against the latch shoulder 80 to move the frame latch 72 out of engagement with the arm latch plate 62. The pickup is then backed toward the frame 22 so that as the tongue 24 slides within the tongue housing 38 toward the axle portion 16 the pair of links 66 pivots the arm 58 upwardly and rearwardly, by reason of the rearwardly connected end portion of the links being disposed upwardly with respect to a plane extending between the pivotal connection of the forward end portion of the links and the longitudinal axis of the axle portion 16, thus pivoting the tangs 56 toward the surface of the earth with the mass of the hay bale 125 being controlled in the movement toward the surface of the earth by the mass and power of the pickup. With the frame 22 again disposed, as shown in FIGS. 1 to 4, the bale 125 is again resting on the surface of the earth and the rearward end portion of the tongue 24 is in contact with the adjacent surface of the axle portion 16. When the lever 112 is released the springs 120, retracting the rods 92, forces the box members 86 downwardly and engages the latch pin 90 with the tongue recess 82 which prevents slidable extension of the forward end of the tongue 24 with respect to the tongue housing 38. The device 15 is now in unloaded travel position and may be pulled away from the new position of the bale 125.

Obviously the invention is susceptible to changes or alterations without defeating its practicability, therefore, we do not wish to be confined to the preferred embodiment shown in the drawings and described herein.

We claim:

1. A self-loading bale transport, comprising:
    a trailer having an axle portion journalling wheels;
    tongue guide means pivotally connected with said axle portion,
        said tongue guide means comprising a housing having an opening therethrough with the axis of the opening substantially normal to the longitudinal axis of said axle portion, and,
        a pair of tongue braces projecting forwardly from said axle portion and connected with said housing,
    said trailer having a sliding tongue slidably supported by said tongue guide means for movement toward and away from said axle portion;
    hitch means connected with the forward end portion of said sliding tongue for connection with a prime mover;
    a forklift frame mounted on said axle portion,
        said frame including a normally upright inverted U-shaped portion having a bight portion and having a pair of normally horizontal tangs extending rearwardly in spaced relation;
    forwardly projecting arm-brace means connected with said bight portion;
    a latch plate secured to the forwardly projecting end portion of said arm-brace means;
    at least one link extending between and connected at its respective ends with said arm-brace means and the forward end portion of said sliding tongue for vertical pivoting movement of said frame about the axis of said axle portion from a bale loading position to a bale transporting position in respone to sliding movement of said sliding tongue relative to said tongue guide means;
    latch means connecting said frame with said sliding tongue and said tongue guide means; and,
    remotely operated control means operatively connected with said wheels and said latch means for preventing rotation of said wheels during pivoting movement of said frame and releasing said latch means.

2. The bale transport according to claim 1 in which the forklift frame inverted U-shape includes depending legs.

3. The bale transport according to claim 2 wherein the arm-brace means is defined further to include:
    an elongated arm, having one end connected to the axle portion generally between the ends of the axle portion, the arm being inclined upwardly and forwardly with respect to the vertical plane of the legs of the forklift frame,
        said arm being movable with the upright portion of the forklift frame generally toward and generally away from the housing of the tongue guide means; and,
    an arm-brace connecting the upper end portion of said arm with said bight portion.

4. The bale transport according to claim 3 wherein the latch means includes:
    a tube mounted on the housing of the tongue guide means;
    a latch slidably disposed in the tube; and,
    means biasing the latch in a direction for engaging the latch plate on the arm-brace means in the bale transporting position of the forklift frame, the engagement between the latch and the latch plate latching the forklift frame in the bale transporting position.

5. The bale transport according to claim 4 wherein the tongue includes a recess formed in a portion thereof; and wherein the latch means is defined further to include:
    a latch pin removably received in the recess formed in the tongue in the bale loading position of the forklift frame latching the forklift frame in the bale loading position when received in the recess in the tongue;
    means connected to the latch pin for pivoting the latch pin into the recess in the tongue and for pivoting the latch pin from the recess in the tongue; and,
    rod means for simultaneously releasing the engagement between the latch plate on the arm-brace means and the latch and the latch pin from the recess in the tongue.

6. The bale transport according to claim 5 wherein the latch disposed in the tube includes a shoulder; and wherein the rod means includes:
- at least one latch rod disposed near the arm, one end of the latch rod being connected to the means for pivoting the latch pin and the other end of the latch rod abutting the shoulder on the latch in the bale transporting position of the forklift frame;
- a rod plate slidably supported on the arm and connected to the latch rod;
- means acting on said plate and biasing said latch rod toward said axle portion, the movement of said latch rod away from said axle portion releasing the latch and the latch pin.

7. The bale transport according to claim 6 wherein the wheels are provided with wheel brakes and wherein the means preventing rotation of the wheels and releasing the latch means is defined further to include:
- a master cylinder;
- lever means for operating said master cylinder;
- a slave cylinder having a piston rod contacting said rod plate; and,
- the master cylinder being connected to the slave cylinder and the wheel brakes.

* * * * *